(12) United States Patent
Sakamoto

(10) Patent No.: US 7,834,517 B2
(45) Date of Patent: Nov. 16, 2010

(54) LINEAR DRIVE ULTRASONIC MOTOR

(75) Inventor: Tetsuyuki Sakamoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/622,567

(22) Filed: Nov. 20, 2009

(65) Prior Publication Data

US 2010/0133955 A1 Jun. 3, 2010

(30) Foreign Application Priority Data

Dec. 1, 2008 (JP) .............................. 2008-306625

(51) Int. Cl.
*H01L 41/98* (2006.01)
(52) U.S. Cl. ................................. 310/323.02
(58) Field of Classification Search ............ 310/323.02, 310/328
See application file for complete search history.

(56) References Cited

U.S. PATENT DOCUMENTS

| 5,191,688 | A * | 3/1993 | Takizawa et al. ............ 29/25.35 |
| 6,218,767 | B1 * | 4/2001 | Akada et al. ............ 310/323.02 |
| 6,831,393 | B2 * | 12/2004 | Miyazawa ............. 310/323.14 |
| 7,268,464 | B2 * | 9/2007 | Kishi .................... 310/323.02 |
| 7,679,265 | B2 * | 3/2010 | Higashionji et al. .... 310/323.02 |

FOREIGN PATENT DOCUMENTS

JP 3524248 2/2004

OTHER PUBLICATIONS

Abstract of Japanese Patent Publication No. 09-191670, dated Jul. 22, 1997.

* cited by examiner

*Primary Examiner*—Mark Budd
(74) *Attorney, Agent, or Firm*—Scully, Scott, Murphy & Presser, P.C.

(57) ABSTRACT

A linear drive ultrasonic motor includes at least an ultrasonic vibrator having a piezoelectric element, a driven member which is driven by a frictional force between the ultrasonic vibrator and the driven member, a pressing member which presses the ultrasonic vibrator such that a frictional force is generated between the ultrasonic vibrator and the driven member, a rolling member having a spherical shape, which makes a contact with the driven member, and a base member which movably supports the driven member via the rolling member. The rolling member makes a contact with the base member at a first contact point, and makes a contact with the driven member at two second contact points. Lengths of two straight lines which connect the first contact point and the two second contact points are substantially same.

9 Claims, 10 Drawing Sheets

10

10

LINEAR DRIVE ULTRASONIC MOTOR

CROSS-REFERENCE TO RELATED APPLICATION

The present application is based upon and claims the benefit of priority from the prior Japanese Patent Application No. 2008-306625 filed on Dec. 1, 2008; the entire contents of which are incorporated herein by reference.

BACKGROUND OF THE INVENTION

1. Field of the Invention

The present invention relates to a linear drive ultrasonic motor.

2. Description of the Related Art

A vibration apparatus in Japanese Patent No. 3524248 Specification (FIG. 9 and FIG. 10) can be cited as an example of a conventional linear drive ultrasonic motor. Here, FIG. 9 and FIG. 10 are diagrams showing a structure of the conventional linear drive ultrasonic motor, where, FIG. 9 is an exploded perspective view, and FIG. 10 is a vertical cross-sectional view.

The vibration apparatus shown in FIG. 9 and FIG. 10 includes a case 906 which accommodates a vibrating body 901, a mobile object 904 which passes through the case 906 and makes a contact with the vibrating body 901, and a pressing spring 905 which generates thrust (a bias) which brings the mobile object 904 and the vibrating body 901 in a pressurized contact. The pressing spring 905 is installed at an outer side of the case 906. An opening portion is formed in a side of the case 906, facing the vibrating body 901, and the thrust of the pressing spring 905 acts on the vibrating body 901 through the opening portion. In other words, this vibration apparatus has a structure in which, the pressing spring 905 is installed on the outer side of the case 906 while covering the opening portion of the case 906, and a deformed portion (a flat surface portion covering the opening portion) of the pressing spring 905 which generates the thrust, is exposed.

As in the vibration apparatus described in Japanese Patent No. 3524248 Specification, structuring main components in a packaged unit is effective from a point of general versatility and stabilization of characteristics. Whereas, in an ultrasonic motor apparatus, a small size and a high output have been sought.

In the vibration apparatus described in Japanese Patent No. 3524248 Specification, the structure is such that the mobile object 904 is guided in a direction of movement and around an axis of the mobile object 904 by a sliding bearing which is provided in a hole of the case 906. In this structure, since the mobile object 904 is pressed against the case 906 by the pressing spring 905, a contact pressure of a contact portion with the sliding bearing provided in the hole of the case 906 is high, and a sliding friction when the mobile object 904 moves is substantial. Therefore, a sliding resistance becomes substantial and causes degradation of the output. Moreover, since the mobile object 904 is vibrated by the vibrating body 901, a wearing out of a sliding-friction portion is accelerated. For instance, when a bearing such as a thrust bearing which is used generally in this portion is used, it leads to an increase in the apparatus size. Moreover, in the vibration apparatus described in Japanese Patent No. 3524248 Specification, providing a guide mechanism which guides the mobile object 904, at an interior of the case 906 is difficult from a point of view of small sizing, and furthermore, it is difficult to form a guide mechanism having a less frictional resistance while maintaining the small size, at the interior of the case 906.

SUMMARY OF THE INVENTION

The present invention is made in view of the abovementioned circumstances, and an object of the present invention is to provide a linear drive ultrasonic motor in which it is possible to guide assuredly while reducing a transfer resistance and a frictional resistance of a driven member, and to make a size small.

To solve the abovementioned issues and to achieve the object, according to the present invention, there is provided a linear drive ultrasonic motor including at least, an ultrasonic vibrator having a piezoelectric element, a driven member which is driven relatively by a frictional force between the ultrasonic vibrator and the driven member, a pressing member which presses the ultrasonic vibrator such that a friction force is generated between the ultrasonic vibrator and the driven member, a rolling member having a spherical shape, which makes a contact with the driven member, and a base member which movably supports the driven member via the rolling member, and the rolling member makes a contact with the base member at a first contact point, and makes a contact with the driven member at two second contact points, and lengths of two straight lines which connect the first contact point and the two second contact points are substantially same.

In the linear drive ultrasonic motor of the present invention, it is preferable that the base member has a curved surface in a range in which, at least the first contact point exists.

In the linear drive ultrasonic motor of the present invention, it is preferable that the driven member has two flat surfaces on a side of the rolling member, corresponding independently to the two second contact points respectively.

In the linear drive ultrasonic motor of the present invention, it is preferable that in the driven member, an angle made by the two flat surfaces corresponding to the two second contact points respectively, is a right angle.

A fillet may be formed at a right-angled portion made by the two flat surfaces.

In the linear drive ultrasonic motor of the present invention, it is preferable that in the driven member, an angle made by the two flat surfaces corresponding to the two second contact points respectively, is an obtuse angle.

In the linear drive ultrasonic motor of the present invention, it is preferable that the base member has a protruding portion which protrudes in a direction orthogonal to a direction in which the driven member is driven, and which is formed continuously along the direction in which the driven member is driven.

DETAILED DESCRIPTION OF THE INVENTION

Exemplary embodiments of a linear drive ultrasonic motor according to the present invention will be described below in detail by referring to the accompanying diagrams. However, the present invention is not restricted by the embodiments described below.

First Embodiment

An ultrasonic motor 10 (a linear drive ultrasonic motor) according to a first embodiment will be described below while referring to diagrams from FIG. 1 to FIG. 6.

Figure 1:
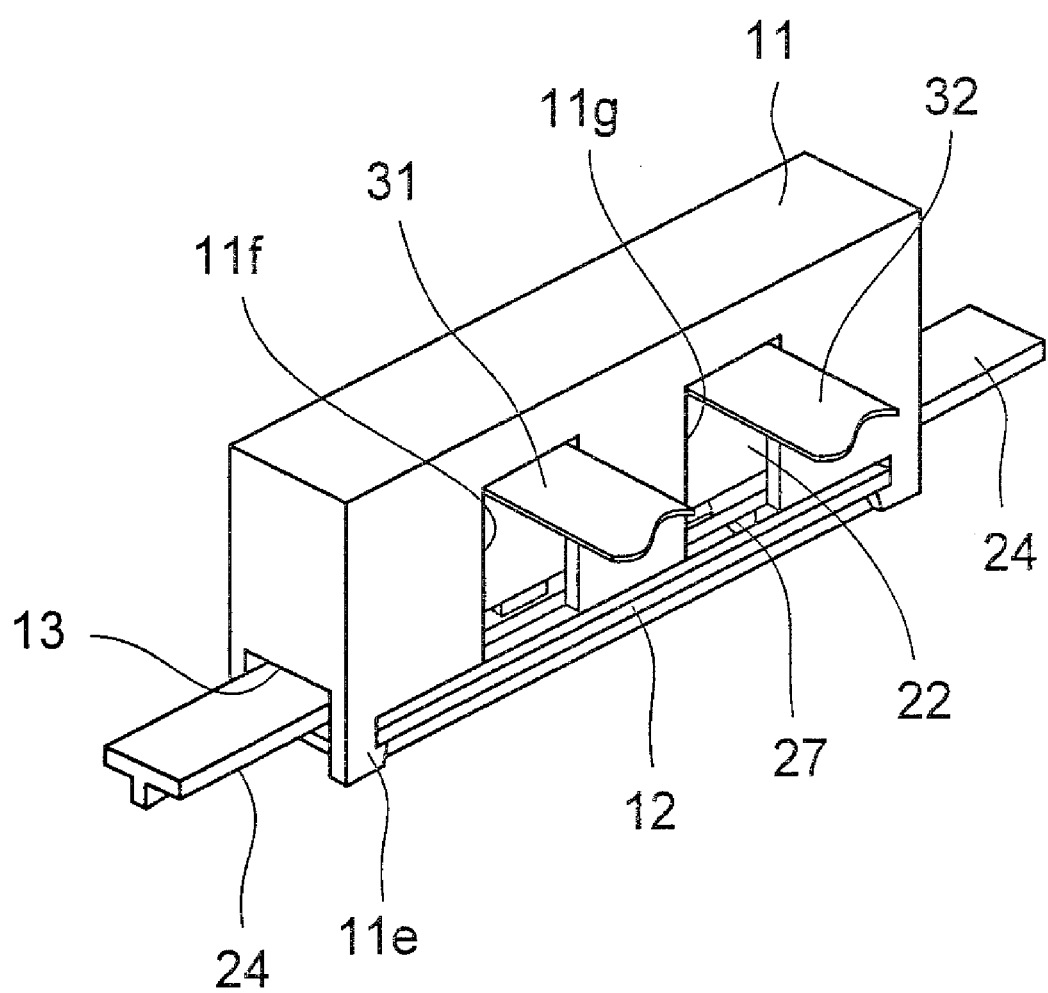
FIG. 1 is a perspective view showing an outward appearance of an ultrasonic motor according to a first embodiment of the present invention.
Figure 2:
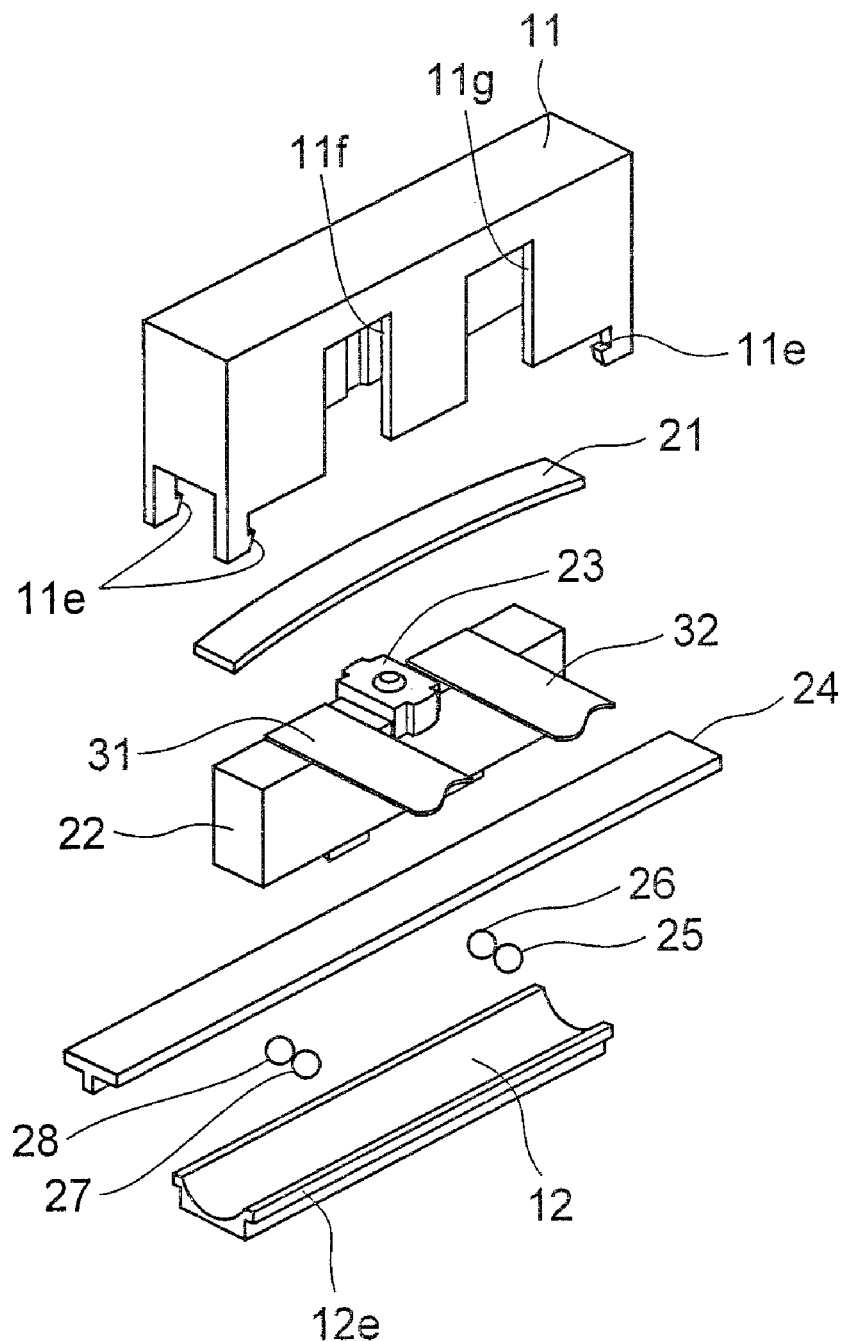
FIG. 2 is an exploded perspective view showing a structure of the ultrasonic motor according to the first embodiment of the present invention.
Figure 3:
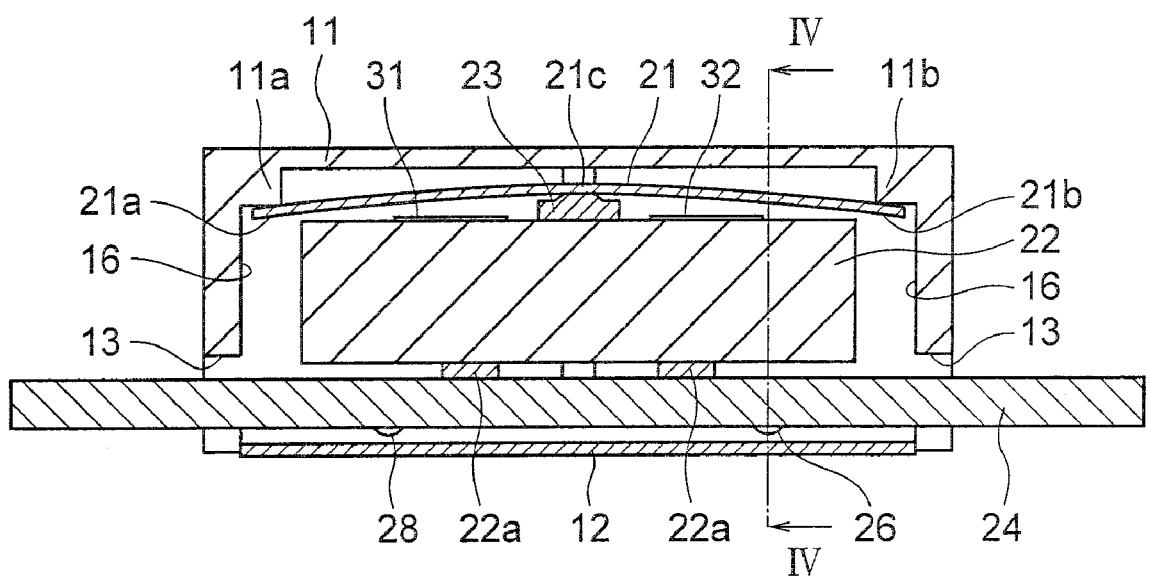
FIG. 3 is a vertical cross-sectional view along a longitudinal direction of the ultrasonic motor according to the first embodiment of the present invention.
Figure 4:
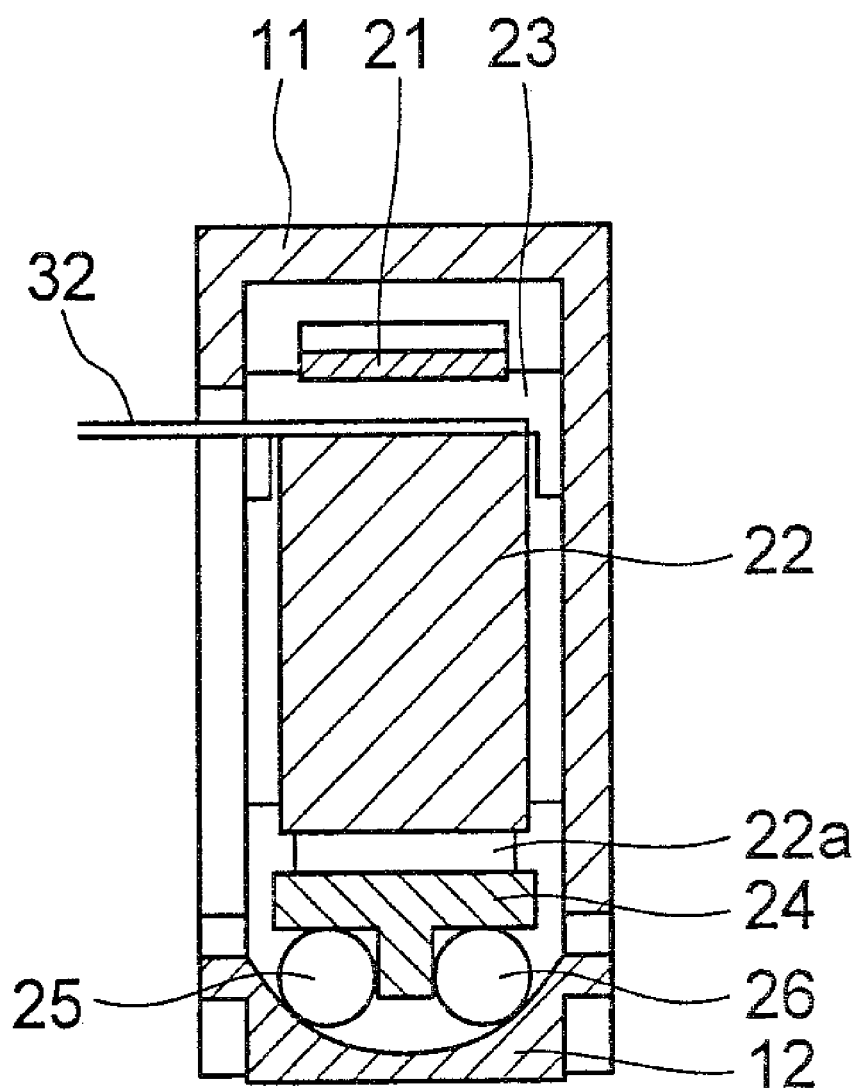
FIG. 4 is a cross-sectional view taken along a line IV-IV in FIG. 3.
Figure 5:
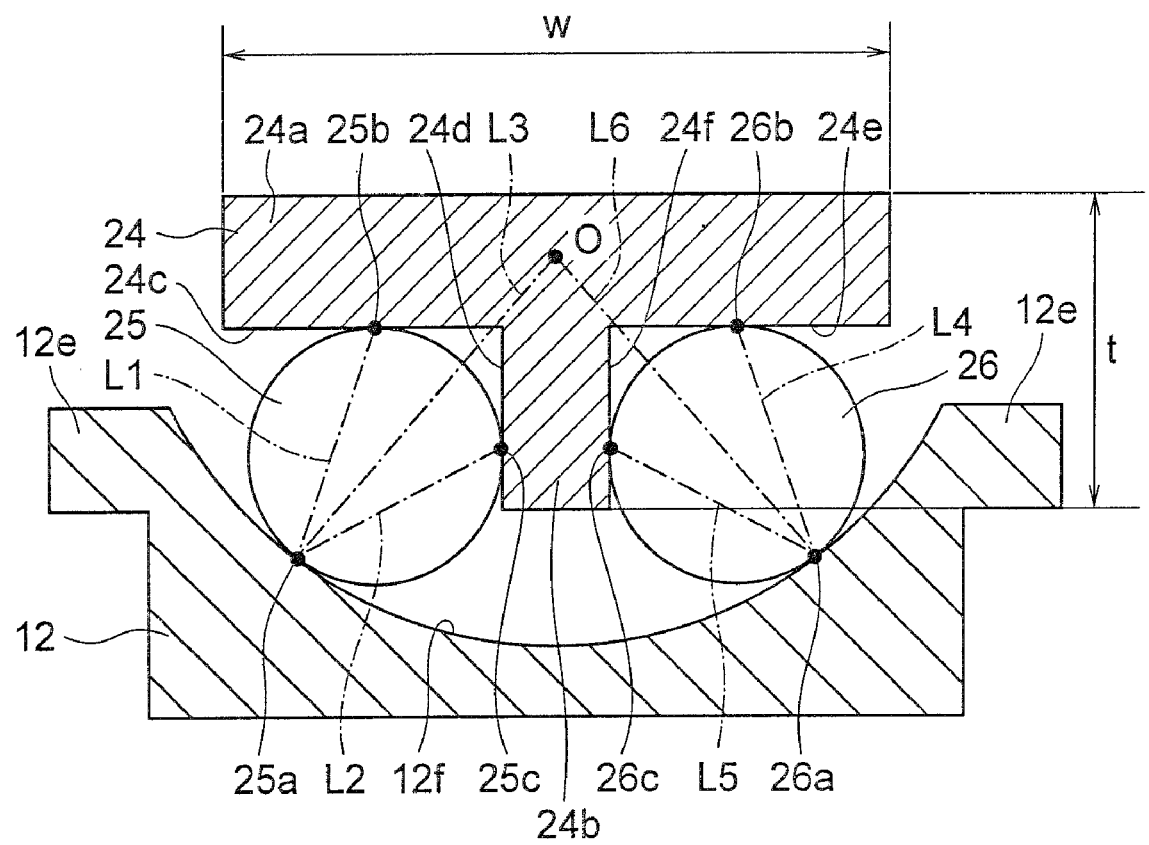
FIG. 5 is a cross-sectional view showing a driven member, a rolling member, and a base member in FIG. 4 in an enlarged form.
Figure 6:
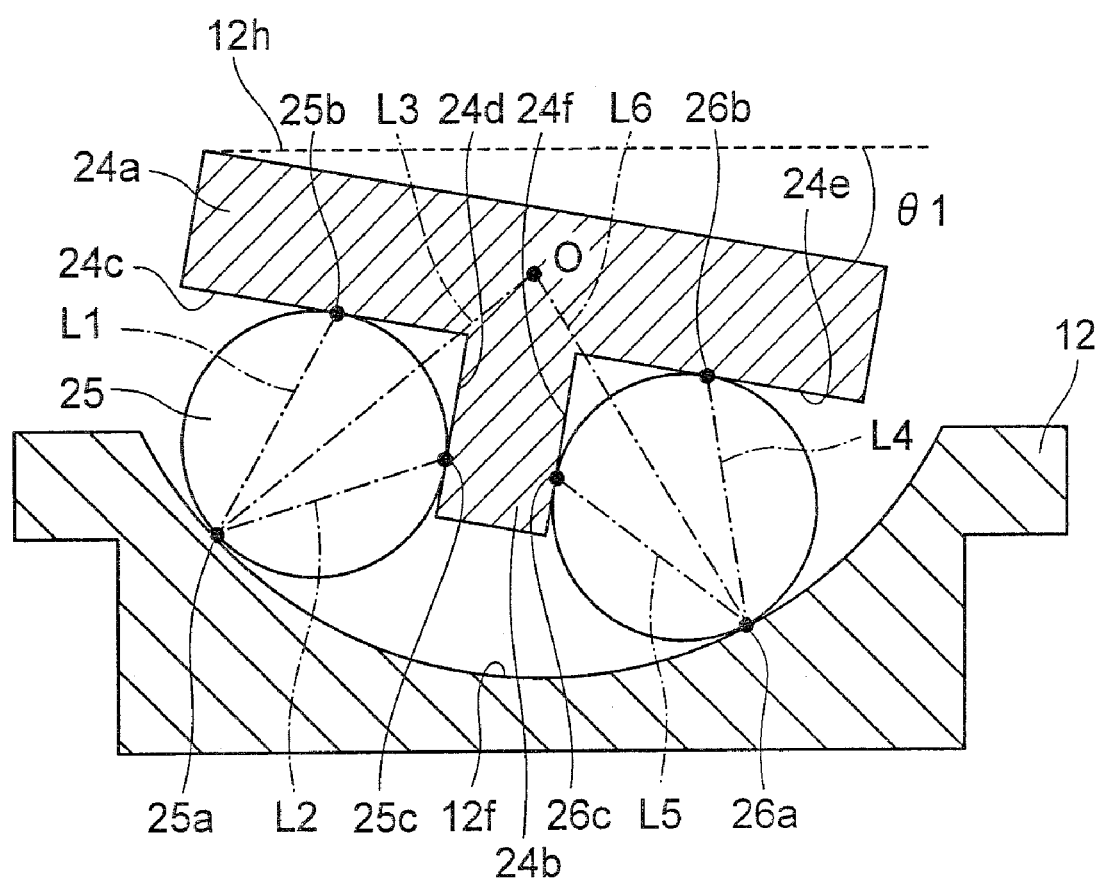
FIG. 6 is a cross-sectional view showing a state in which, the driven member is inclined only by an angle θ1, with respect to FIG. 5.

Here, FIG. 1 is a perspective view showing an outward appearance of the ultrasonic motor 10. FIG. 2 is an exploded perspective view showing a structure of the ultrasonic motor 10. FIG. 3 is a vertical cross-sectional view along a longitudinal direction of the ultrasonic motor, or in other words, a direction in which a driven member 24 is driven. FIG. 4 is a cross-sectional view along a line IV-IV in FIG. 3. FIG. 5 is a cross-sectional view showing the driven member 24, rolling members 25, 26, 27, and 28, and a base member 12 in FIG. 4, in an enlarged form, and is a diagram showing the driven member 24 in a horizontal state. FIG. 6 is a cross-sectional view showing a state in which, the driven member 24 is inclined only by an angle θ1, with respect to FIG. 5.

The ultrasonic motor 10 includes a vibrator 22 as an ultrasonic vibrator, the driven member 24, a pressing member 21, the rolling members 25, 26, 27, and 28, a case member 11, and a base member 12. Each of these members will be described below in detail.

Both the vibrator 22 and the case member 11 have a substantially rectangular parallelepiped outer shape, and an accommodating recess 16 is formed at an interior of the case member 11. The driven member 24 sticks out from an opening portion 13 which is closed by disposing the base member 12. The vibrator 22 and the pressing member 21 are accommodated inside the accommodating recess 16 in order from a side of the opening portion 13 in a direction of height (a vertical direction in diagrams from FIG. 1 to FIG. 4) of the ultrasonic motor 10.

A latching portion 11e which is used for fixing with respect to the base member 12 is provided in four angular portions at a lower portion of the case member 11. A protruding portion 12e with which, the latching portion 11e of the case member 11 is latched, is provided at an upper edge of the base member 12.

The protruding portion 12e is formed continuously along a longitudinal direction of the base member 12 having a rectangular shape in a plan view, and is protruded toward an outer side in a direction of width. Consequently, when the base member 12 is fixed to the case member 11, the protruding portion 12e protrudes in a direction orthogonal to the direction in which the driven member 24 is driven, and is formed continuously along the direction in which the driven member 24 is driven. The protruding portion 12e can be formed by an extrusion or a drawing process, and accordingly it is also possible to reduce a manufacturing cost.

The latching portion 11e and the protruding portion 12e, when latched mutually, a latching position and shape are set such that an amount of bending of the pressing member 21 due to the pressing portions 11a and 11b of a supporting member 23 and the case member 11 is a predetermined amount. In other words, by the case member 11 and the base member 12 being fixed by being latched mutually, the vibrator 12 is biased toward the driven member 24 by a predetermined thrust.

The pressing member 21 is a plate spring in the form of a long plate, and is disposed such that a longitudinal direction thereof is along a longitudinal direction (left-right direction in FIG. 3) of the ultrasonic motor 10 and the case member 11. It is also possible to let the case member 11 to have a shape other than the shape shown in FIG. 1. Moreover, it is also possible to make a structure in which the case member 11 does not have an independent form called the case member 11.

An upper surface of two end portions 21a and 21b in the longitudinal direction of the pressing member 21 makes a contact with the pressing portions 11a and 11b formed at an upper side angular portion of an inner surface of the case member 11. Furthermore, a lower surface of a central portion 21c of the pressing member 21 makes a contact with the supporting member 23 for positioning of the vibrator 22. Here, the supporting member 23 is fixed to a center in the longitudinal direction (left-right direction in FIG. 3) of the vibrator 22.

The vibrator 22 is formed by an ultrasonic vibrator (such as a piezoelectric element). Flexible cables 31 and 32 for supplying an electric power are firmly connected to an upper surface of the vibrator 22, sandwiching the supporting member 23. The flexible cables 31 and 32 are extended to an outside from openings 11f and 11g formed in a side surface of the case member 11.

The driven member 24 is movably disposed on the base member 12, along the longitudinal direction of the case member 11 via the rolling members 25, 26, 27, and 28 having a spherical shape. The driven member 24 is movably pinched by a drive element 22a which is provided on a lower surface of the vibrator 22, and the rolling members 25, 26, 27, and 28. The rolling members 25, 26, 27, and 28 have the same outer diameter.

The base member 12 is extended in the longitudinal direction of the case member 11, and an inner surface thereof is a circular cylindrical surface 12f having a semicircular cross-sectional shape orthogonal to the longitudinal direction. The rolling members 25, 26, 27, and 28 are pinched by the driven member 24 and the circular cylindrical surface 12f of the base member 12.

The driven member 24 has a substantially rectangular shape in a plan view, and a cross-section orthogonal to the longitudinal direction of the driven member 24 is substantially T-shaped as shown in FIG. 5. Concretely, the driven member 24 is made of a base portion 24a having a substantially rectangular parallelepiped shape, an upper surface of which makes a contact with the drive element 22a of the vibrator 22, and a protrusion 24b which protrudes downward from a central portion in a direction of width of the base portion 24a. A width of the base portion 24a is W, and a height from an upper surface of the base portion 24a up to a lower surface of the protrusion 24b is t.

Next, a positional relationship of the rolling members 25, 26, 27, and 28, the base member 12, and the driven member 24 will be described below while referring to FIG. 5 and FIG. 6. Since the rolling members 25 and 26 and the rolling members 27 and 28 have the same structure, the rolling members 25 and 26 are described below, and the description of the rolling members 27 and 28 is omitted.

A curved surface having a radius r of the circular cylindrical surface 12f of the base member 12 is a surface which is continuous in the longitudinal direction of the base member 12. A center O of the radius r of the circular cylindrical surface 12f is a point at which, a straight line L3 which passes through a contact point 25a (a first contact point) of the rolling member 25 and the circular cylindrical surface 12f, and a center of the rolling member 25, and a straight line L6 which passes through a contact point 26a (a first contact point) of the rolling member 26 and the circular cylindrical surface 12f, and a center of the rolling member 26, intersect.

The rolling member 25, on one hand, makes a contact with the circular cylindrical surface 12f of the base member 12 at one point of the contact point 25a, and on the other hand, makes a contact with the driven member 24 at two contact points 25b and 25c (second contact points). Concretely, the rolling member 25 makes a contact with a flat surface 24c which is a lower surface of the base portion 24a of the driven member 24, at the contact point 25b, as well as, makes a contact with a flat surface 24d which is a side surface of the protrusion 24b, at the contact point 25c. To put in other words, the driven member 24 has two flat surfaces 24c and 24d mutually adjacent at a right angle, at a side facing the rolling member 25, and the rolling member 25 makes a contact with each of the flat surfaces 24c and 24d.

Here, a width of the flat surface 24c and a height of the flat surface 24d are longer than a radius of the rolling member 25, and are shorter than a distance of the base member 12 and the rolling member 25 up to the contact point 25a.

A flat surface at which, the rolling member 25 makes a contact with the driven member 24, may not be mutually adjacent as the flat surfaces 24c and 24d. Concretely, it may be another flat surface or curved surface formed by providing a fillet to a line-intersection portion of the flat surfaces 24c and 24d.

Moreover, a length of a straight line L1 which connects the contact point 25a with the circular cylindrical surface 12f of the base member 12 and the contact point 25b with the flat surface 24c is same as a length of a straight line L2 which connects the contact point 25a and the contact point 25c with the flat surface 24d.

Similarly as the rolling member 25, the rolling member 26 makes a contact with the circular cylindrical surface 12f of the base member 12 at one point of the contact point 26a, as well as makes a contact with the driven member 24 at two contact points 26b and 26c (the second contact points). In other words, the rolling member 26 makes a contact with a flat surface 24e which is a lower surface of the base portion 24a of the driven member 24, at the contact point 26b, as well as, makes a contact with a flat surface 24f which is a side surface of the protrusion 24b, at the contact point 26c. Here, the driven member 24 has two flat surfaces 24e and 24f mutually adjacent at a right angle, at a side facing the rolling member 26, and the rolling member 26 makes a contact with each of the flat surfaces 24e and 24f.

Here, a width of the flat surface 24e and a height of the flat surface 24f are longer than a radius of the rolling member 26, and are shorter than a distance of the base member 12 and the rolling member 26 up to the contact point 26a.

A flat surface at which, the rolling member 26 makes a contact with the driven member 24, may not be mutually adjacent as the flat surfaces 24e and 24f.

Moreover, a length of a straight line L4 which connects the contact point 26a with the circular cylindrical surface 12f of the base member 12 and the contact point 26b with the flat surface 24e is same as a length of a straight line L5 which connects the contact point 26a and the contact point 26c with the flat surface 24f.

By disposing the driven member 24 and the rolling members 25 and 26 in such manner, when the driven member 24 is driven, in the direction in which the driven member 24 is driven, a length of a rolling contact at the contact point 25b and a length of a rolling contact at the contact point 25c become same, and moreover, a length of a rolling contact at the contact point 26b and a length of a rolling contact at the contact point 26c becomes same. Therefore, a slippage occurs between the driven member 24 and the rolling members 25 and 26.

Moreover, in the rolling member 25, since the contact points 25b and 25c are at symmetrical positions with respect to the contact point 25a, a drag at the contact points 25b and 25c becomes equal and a rolling resistance becomes equal. Similarly, in the rolling member 26, since the contact points 26b and 26c are at symmetrical positions with respect to the contact point 25a, a drag at the contact points 26b and 26c becomes equal, and a rolling resistance becomes equal.

Furthermore, an arrangement is made such that in a state of the driven member 24 biased toward the base member 12, the driven member 24 is subjected to forced vibration by receiving vibrations of the vibrator 22. By making such structure, since it is rollingly supported all the time without being slipped, a reduction in output is prevented by making a transfer resistance of the driven member 24 small, and there is an effect of a decrease in wear out.

Moreover, generally, when a driven body is deformed due to bending, there is a possibility that driving characteristics are degraded, and it is important to secure stiffness by increasing a thickness of the driven body. However, by increasing the thickness, there is a problem of an increase in a size of the apparatus. Whereas, in the ultrasonic motor 10 according to the first embodiment, the protrusion 24b which protrudes downward from the center in the direction of width of the base portion 24a is formed such that the driven member 24 which is a driven body has a substantially T-shaped cross-section.

By increasing a thickness t in a direction of height (a vertical direction in FIG. 5) of the ultrasonic motor 10 by letting the driven member 24 have such cross-sectional shape, even when the driven member 24 which is a driven body is biased by a pressing mechanism formed of a member such as the pressing member 21, the driven member 24 has a stiffness which makes it difficult to bend the driven member 24, in the direction of height of the ultrasonic motor 10 (the vertical direction in FIG. 5). Furthermore, it is possible to accommodate the rolling members 25, 26, 27, and 28 in a range narrower than the width W of the driven member 24, in the direction of width (a left-right direction in FIG. 5) of the base portion 24a. Moreover, it is possible to dispose the points of contact of the rolling members 25, 26, 27, and 28 and the driven member 24 in the direction of height at a position shorter than the height t of the driven member, or in other words, a position higher than the lowermost portion of the driven member 24.

By positioning in such manner, it is possible to make small dimensions in the direction of height and the direction of width of the ultrasonic motor 10. Consequently, in the ultrasonic motor 10 including a rollingly supported structure by such shape and arrangement of the driven member 24 and the base member 12, it is possible to prevent degradation of characteristics due to insufficient stiffness, and to make the size small.

Moreover, by a structure in which, the rolling members 25, 26, 27, and 28 make a contact with the circular cylindrical surface of the base member 12, even when an angle of a contact surface of the vibrator 22 and the driven member 24 has changed, a contact relationship of the driven member 24 and the base member 12, and the rolling members 25, 26, 27, and 28 is maintained.

Concretely, citing an example of the rolling members 25 and 26, when the driven member 24 is inclined only by angle $\theta 1$ (where, $0<\theta 1$) with respect to the horizontal direction as shown in FIG. 6, a point that the length of the straight line L1 and the length of the straight line L2 in the rolling member 25 are same, and a point that the length of the straight line L4 and the length of the straight line L5 in the rolling member 26 are same are constant irrespective of the angle of inclination $\theta 1$ of the driven member 24. Therefore, according to a variation in assembling, even when a contact surface of the vibrator 22 and the driven member 24 is inclined by the angle $\theta 1$ from the horizontal direction, it is possible to reduce an effect thereof. Here, the inclination of the contact surface of the vibrator 22 and the driven member 24 is permissible provided that the inclination is within a range in which, the contact points 25a and 26a make a contact with the circular cylindrical surface 12f of the base member 12.

The length of the straight line L1 and the length of the straight line L2 may not be the same but substantially equal provided that the rolling members 25, 26, 27, and 28 are rollingly supported without occurrence of slippage, with respect to the base member 12 and the driven member 24. Similarly, the length of the straight line L4 and the length of the straight line L5 may not be the same but substantially equal provided that the rolling members 25, 26, 27, and 28 are rollingly supported without occurrence of slippage, with respect to the base member 12 and the driven member 24.

As it has been described above, in the ultrasonic motor 10 according to the first embodiment, the base member 12 has the circular cylindrical surface 12f, and the spherical shaped rolling members 25, 26, 27, and 28 are mounted on the circular cylindrical surface 12f. The driven member 24 has a substantially T-shaped cross-section, and the protrusion 24b is supported from both sides in the direction of width by the rolling members 25, 26, 27, and 28, in a posture facing the base member 12. Furthermore, each of the rolling members 25, 26, 27, and 28 makes a contact with the driven member 24 at two points, and makes a contact with the base member 12 at one point.

Moreover, for each of the rolling members 25, 26, 27, and 28, the radius and the center of the cylindrical surface of the base member is set such that the length of two straight lines which connect the two contact points with the driven member 24 and one contact point with the base member 12 is substantially equal. Accordingly, since the roiling members 25, 26, 27, and 28 are rollingly supported without occurrence of slippage, with respect to the base member 12 and the driven member 24, even when the driven member 24 is biased toward the base member 12 by the pressing member 21, the transfer resistance is reduced.

Furthermore, even when the driven member 24 vibrates by receiving a drive of the vibrator, since the rolling members 25, 26, 27, and 28 are supported without being slipped with respect to the base member 12 and the driven member 24, it is possible to reduce wearing. Moreover, by the structure and the arrangement of the driven member 24, the rolling members 25, 26, 27, and 28, and the base member 12, it is possible to form in a small size as an ultrasonic motor including such rollingly supported structure.

Second Embodiment

Figure 7:
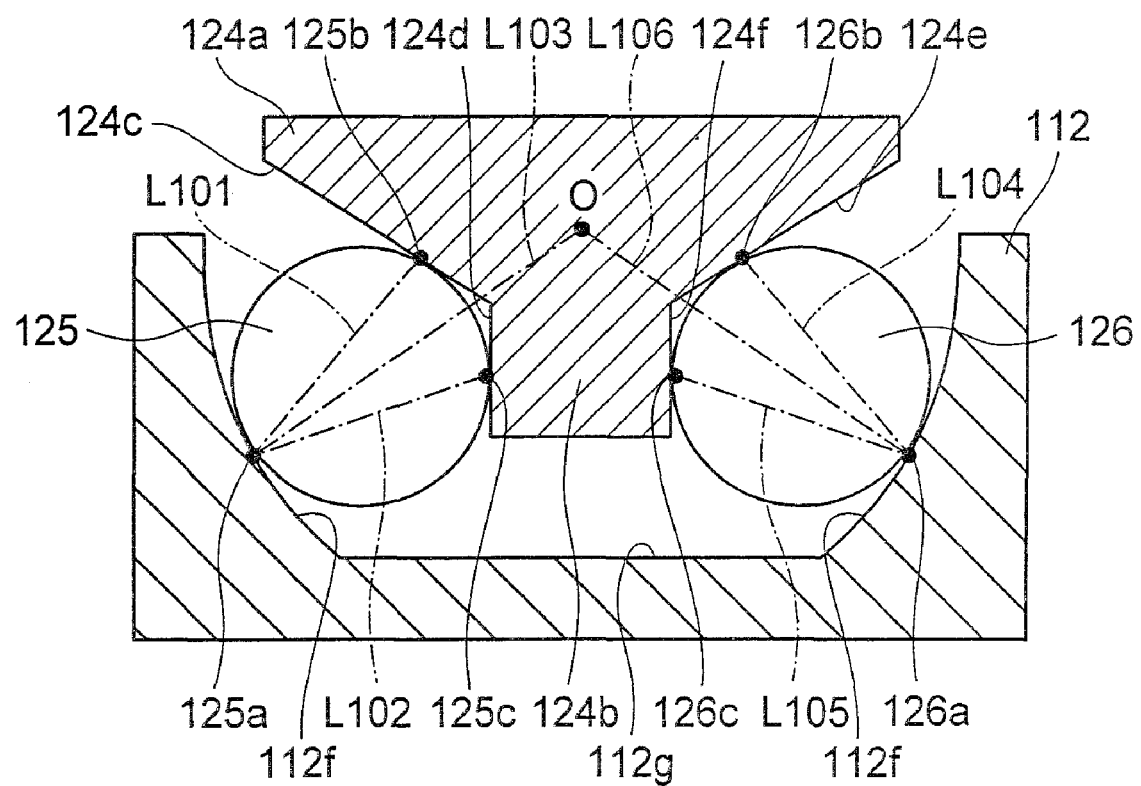
FIG. 7 is a cross-sectional view corresponding to FIG. 5, showing a relationship of a driven member, a rolling member, and a base member according to a second embodiment.
Figure 8:
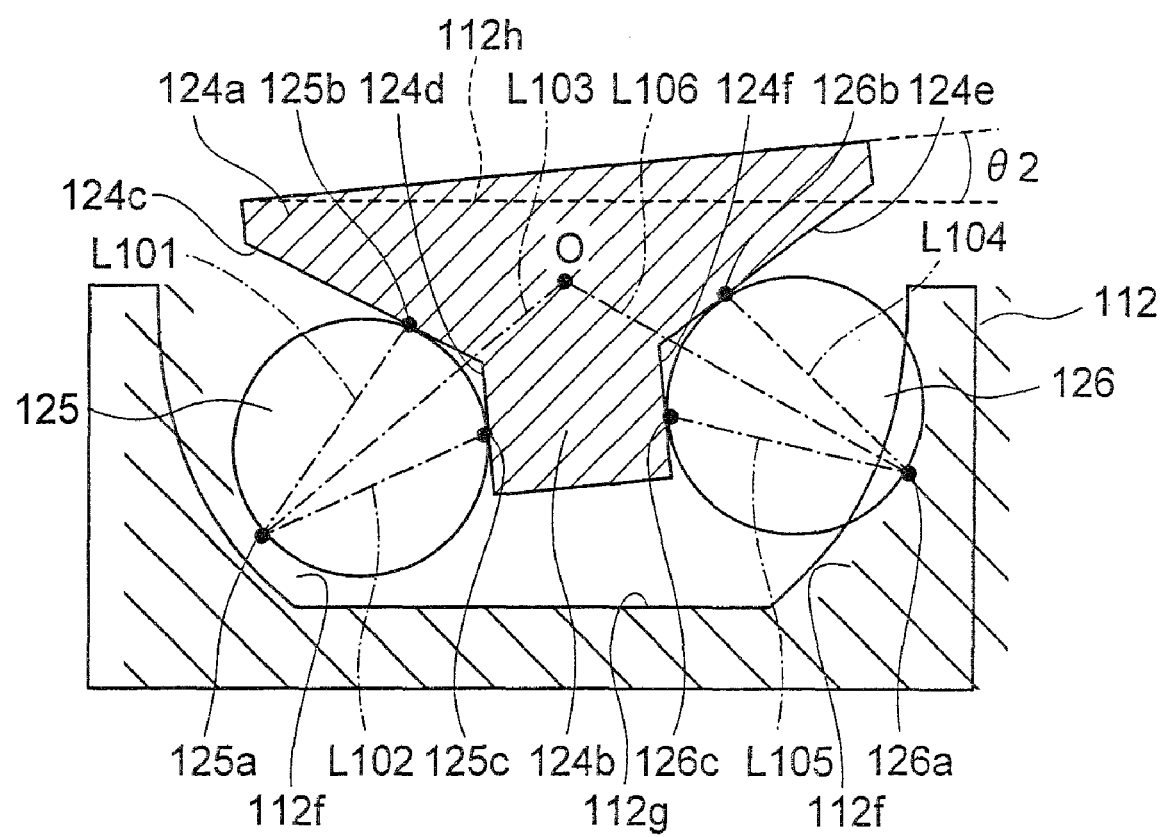
FIG. 8 is a cross-sectional view showing a state in which, the driven member is inclined only by an angle θ2, with respect to FIG. 7.
Figure 9:
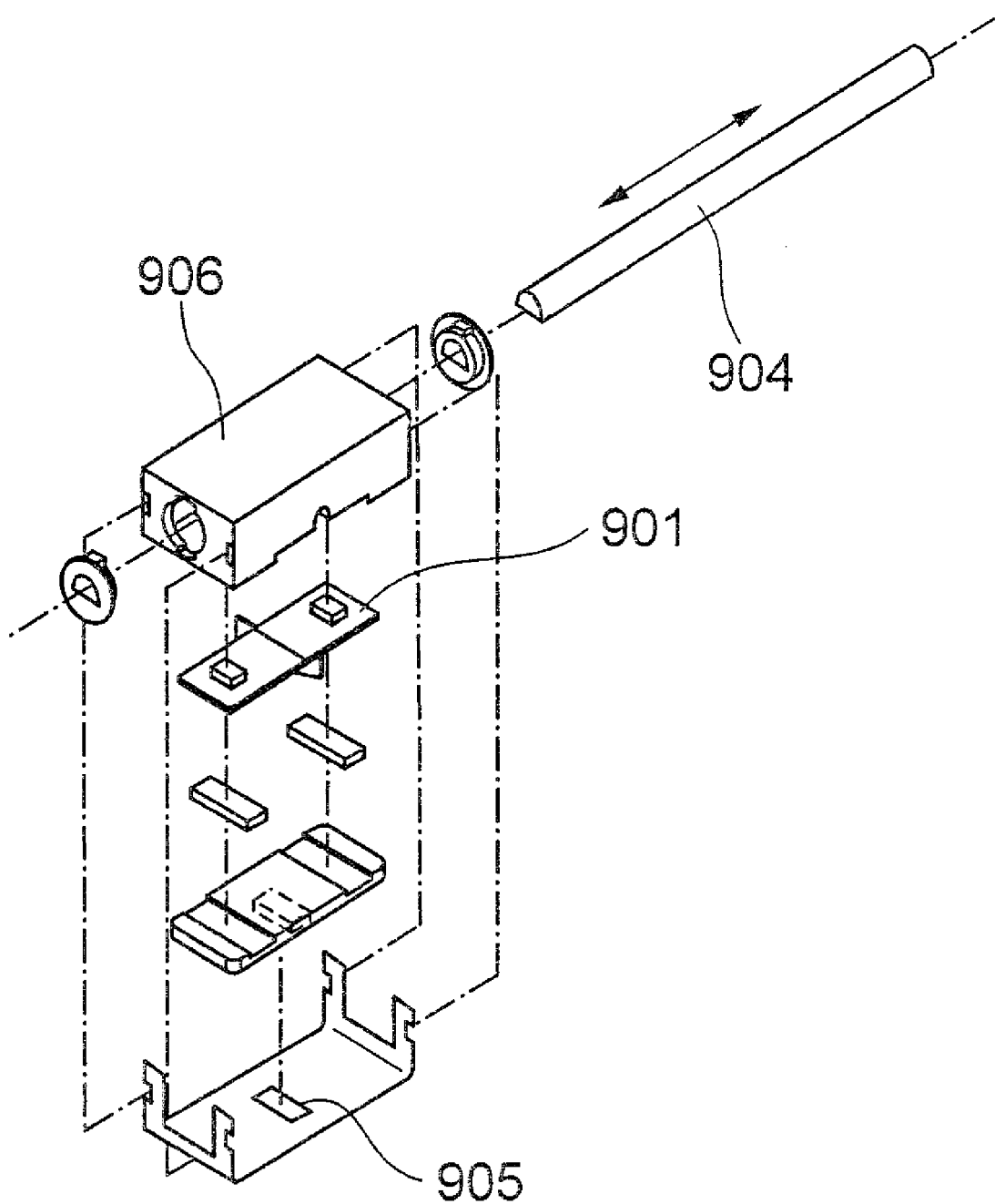
FIG. 9 is an exploded perspective view showing a structure of a conventional linear drive ultrasonic motor.
Figure 10:
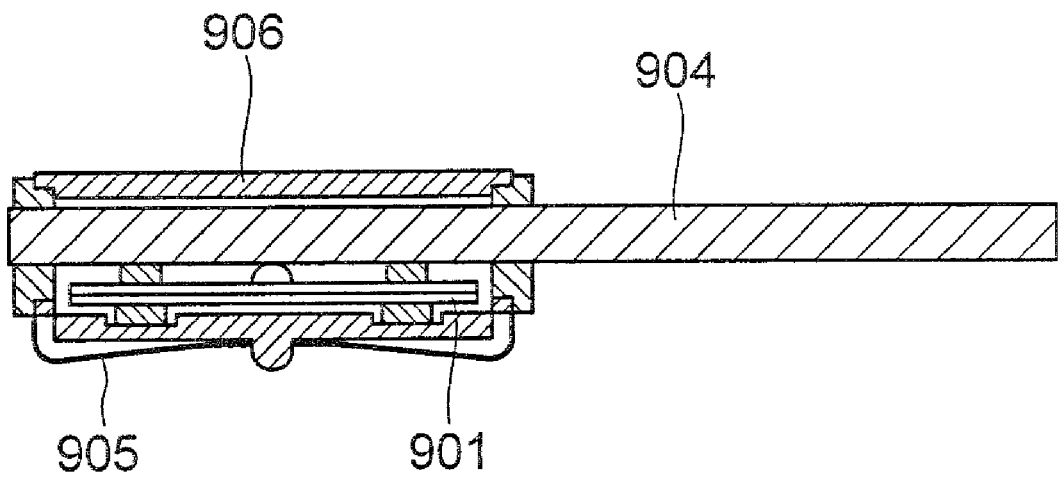
FIG. 10 is a vertical cross-sectional view of the conventional linear drive ultrasonic motor shown in FIG. 9.

An ultrasonic motor according to the second embodiment differs from the ultrasonic motor 10 according to the first embodiment at a point that, an adjacent angle of two flat surfaces which make a contact with rolling members 125 and 126 at a driven member 124 is not a right angle but an obtuse angle as shown in FIG. 7 and FIG. 8.

Here, FIG. 7 is a cross-sectional view corresponding to FIG. 5, showing a relationship of the driven member 124, the rolling members 125 and 126, and a base member 112, and is a diagram showing the driven member 124 in the horizontal state. FIG. 8 is a cross-sectional view showing a state in which, the driven member 124 is inclined only by an angle $\theta 2$, with respect to FIG. 7.

Moreover, in the base member 112 of the second embodiment, a center in a direction of width of an inner surface is a flat surface 112g, and a circular cylindrical surface 112f which forms a part of a radius r having a point of intersection O of a straight line L103 and a straight line L106 as a center, is formed at two sides of the flat surface 112g.

Here, the base member 112, the driven member 124, and the rolling members 125 and 126 of the ultrasonic motor of the second embodiment correspond to the base member 12, the driven member 24, and the rolling members 25 and 26 of the ultrasonic motor 10 of the first embodiment. Moreover, contact points 125a and 126a (first contact points), and contact points 125b, 125c, 126b, and 126c (second contact points) correspond to the contact points 25a and 26a, and the contact points 25b, 25c, 26b, and 26c (second contact points) respectively.

Furthermore, a base portion 124a, a protrusion 124b, flat surfaces 124c, 124d, 124e, and 124f in the driven member 124 of the second embodiment correspond to the base portion 24a, the protrusion 24b, the flat surfaces 24c, 24d, 24e, and 24f respectively of the driven member 24 of the first embodiment. Moreover, straight lines L101, L102, L103, L104, L105, and L106 correspond to the straight lines L1, L2, L3, L4, L5, and L6 respectively of the first embodiment.

Although it is not shown in FIG. 7 and FIG. 8, the ultrasonic motor of the second embodiment, includes rolling members corresponding to the rolling members 27 and 28 in the ultrasonic motor 10 of the first embodiment, apart from the rolling members 125 and 126.

Even in the ultrasonic motor of the second embodiment, an effect similar to the effect of the ultrasonic motor 10 of the first embodiment is achieved, and even when the driven member 124 is inclined as in FIG. 8, a point that a length of the straight line L101 and a length of the straight line L102 in the rolling member 125 are same, and a point that a length of the straight line L104 and a length of the straight line L105 in the rolling member 126 are same are constant irrespective of the angle of inclination $\theta 2$ of the driven member 124.

Therefore, according to a variation in assembling, even when a contact surface of the vibrator 22 and the driven member 124 is inclined by the angle $\theta 2$ from the horizontal direction, it is possible to reduce an effect thereof. Moreover, regarding the inclination of the contact surface of the vibrator 22 and the driven member 124, it is permissible provided that the inclination is within a range in which the contact points 125a and 126a make a contact with the circular cylindrical surface 112f of the base member 112, similarly as in the first embodiment.

By making such shape, as compared to the first embodiment, although a distance between the rolling member 125 and the rolling member 126 becomes wide, it is possible to make small a distance between the base member 112 and the driven member 124. In other words, by changing the shape of the driven member 124 and the base member 112, it is possible to make small selectively the dimensions in the direction of height and in the direction of width of the ultrasonic motor according to the requirement, and a degree of freedom of designing becomes high.

The rest of the structure, action, and effect are similar as in the first embodiment As it has been described above, the linear drive ultrasonic motor according to the present invention is suitable for a highly accurate drive of small-size equipment.

The linear drive ultrasonic motor according to the present invention has a structure which is capable of reducing a transfer resistance and a frictional resistance of the driven member while guiding the driven member assuredly, and further shows an effect that it is possible to maintain the small size, or make the size further smaller.

What is claimed is:

1. A linear drive ultrasonic motor comprising at least:
   an ultrasonic vibrator having a piezoelectric element;
   a driven member which is driven relatively by a frictional force between the ultrasonic vibrator and the driven member;
   a pressing member which presses the ultrasonic vibrator such that a frictional force is generated between the ultrasonic vibrator and the driven member;
   a rolling member having a spherical shape, which makes a contact with the driven member; and
   a base member which movably supports the driven member via the rolling member, wherein
   the rolling member makes a contact with the base member at a first contact point, and makes a contact with the driven member at two second contact points, and
   lengths of two straight lines which connect the first contact point and the two second contact points are substantially same.

2. The linear drive ultrasonic motor according to claim 1, wherein the base member has a curved surface in a range in which, at least the first contact point exists.

3. The linear drive ultrasonic motor according to claim 2, wherein the driven member has two flat surfaces on a side of the rolling member, corresponding independently to the two second contact points respectively.

4. The linear drive ultrasonic motor according to claim 3, wherein in the driven member, an angel made by the two flat surfaces is a right angle.

5. The linear drive ultrasonic motor according to claim 3, wherein in the driven member, an angle made by the two flat surfaces is an obtuse angle.

6. The linear drive ultrasonic motor according to claim 1, wherein the driven member has two flat surfaces on a side of the rolling member, corresponding independently to the two second contact points respectively.

7. The linear drive ultrasonic motor according to claim 6, wherein in the driven member, an angel made by the two flat surfaces is a right angle.

8. The linear drive ultrasonic motor according to claim 6, wherein in the driven member, an angle made by the two flat surfaces is an obtuse angle.

9. The linear drive ultrasonic motor according to one of claims 1 to 8, wherein the base member has a protruding portion which protrudes in a direction orthogonal to a direction in which the driven member is driven, and which is formed continuously along the direction in which the driven member is driven.

* * * * *